US012762103B2

(12) United States Patent
Goyal et al.

(10) Patent No.: US 12,762,103 B2
(45) Date of Patent: Oct. 13, 2026

(54) UNIFIED OLTP/OLAP FORMAT ACROSS MEMORY TIERS

(71) Applicant: Oracle International Corporation, Redwood Shores, CA (US)

(72) Inventors: Neelam Goyal, Foster City, CA (US); Teck Hua Lee, San Mateo, CA (US); Shang-Sheng Tung, Cupertino, CA (US); Qicheng Mi, Belmont, CA (US); Bangalore Vasudev Prashanth, San Ramon, CA (US); Sheldon Andre Kevin Lewis, San Mateo, CA (US); Madhava Krishnan Ramanathan, Redwood City, CA (US); Shasank Kisan Chavan, Menlo Park, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/072,524

(22) Filed: Mar. 6, 2025

(65) Prior Publication Data

US 2026/0064646 A1 Mar. 5, 2026

Related U.S. Application Data

(60) Provisional application No. 63/691,247, filed on Sep. 5, 2024.

(51) Int. Cl.

| | |
|---|---|
| ***G06F 7/00*** | (2006.01) |
| ***G06F 16/22*** | (2019.01) |
| ***G06F 16/23*** | (2019.01) |

(52) U.S. Cl.
CPC ........ *G06F 16/221* (2019.01); *G06F 16/2237* (2019.01); *G06F 16/2343* (2019.01)

(58) Field of Classification Search
CPC . G06F 16/221; G06F 16/2237; G06F 16/2343
See application file for complete search history.

(56) References Cited

U.S. PATENT DOCUMENTS 5,255,356 A 10/1993 Michelman et al.
5,263,145 A 11/1993 Brady et al.
(Continued)

FOREIGN PATENT DOCUMENTS

WO WO 2012/032184 A1 3/2012

OTHER PUBLICATIONS

Winter Corporation, "Demonstrating Efficiency in Large-Scale Data Warehousing", A review of new TPC-H results for the Sun-Sybase IQ Platform, 20 pages, dated in 2003.
(Continued)

*Primary Examiner* — Mohammed R Uddin
(74) *Attorney, Agent, or Firm* — Hickman Becker Bingham Ledesma LLP

(57) ABSTRACT

Techniques for a unified data format that may be used across memory tiers are provided. In one technique, a compression unit is generated that comprises a plurality of data blocks. The compression unit stores tabular data in a columnar format. The plurality of data blocks includes (1) a primary header block that represents a first set of rows of the tabular data and (2) a secondary header block that represents a second set of rows, of the tabular data, that is different than the first set of rows. The compression unit is stored in persistent storage.

20 Claims, 5 Drawing Sheets

(56) References Cited

U.S. PATENT DOCUMENTS

| | | | |
|---|---|---|---|
| 5,404,510 | A | 4/1995 | Smith et al. |
| 5,506,979 | A | 4/1996 | Menon |
| 5,546,575 | A | 8/1996 | Potter et al. |
| 5,699,457 | A | 12/1997 | Adar et al. |
| 5,710,909 | A | 1/1998 | Brown et al. |
| 5,794,229 | A | 8/1998 | French et al. |
| 5,867,723 | A | 2/1999 | Chin et al. |
| 5,995,080 | A | 11/1999 | Biro et al. |
| 6,061,763 | A | 5/2000 | Rubin et al. |
| 6,216,125 | B1 | 4/2001 | Johnson |
| 6,360,213 | B1 | 3/2002 | Wagstaff et al. |
| 6,643,633 | B2 | 11/2003 | Chau et al. |
| 6,959,300 | B1 | 10/2005 | Caldwell et al. |
| 7,076,108 | B2 | 7/2006 | Huang et al. |
| 7,079,056 | B2 | 7/2006 | Weaver |
| 7,103,608 | B1 * | 9/2006 | Ozbutun ........... G06F 16/24557 707/693 |
| 7,188,116 | B2 | 3/2007 | Cheng |
| 7,190,284 | B1 | 3/2007 | Dye et al. |
| 7,225,249 | B1 | 5/2007 | Barry et al. |
| 7,469,266 | B2 | 12/2008 | Gustavson et al. |
| 7,496,586 | B1 | 2/2009 | Bonwick et al. |
| 7,496,589 | B1 | 2/2009 | Jain et al. |
| 7,552,130 | B2 | 6/2009 | Cook et al. |
| 7,552,218 | B2 | 6/2009 | Kaluskar et al. |
| 7,558,290 | B1 | 7/2009 | Nucci et al. |
| 7,565,346 | B2 | 7/2009 | Fan et al. |
| 7,587,430 | B2 | 9/2009 | Suzuki et al. |
| 7,693,325 | B2 | 4/2010 | Pulla et al. |
| 7,707,194 | B2 | 4/2010 | Bresch et al. |
| 7,720,878 | B2 | 5/2010 | Caldwell et al. |
| 7,882,122 | B2 | 2/2011 | Wong |
| 8,032,499 | B2 | 10/2011 | Faerber et al. |
| 8,073,777 | B2 | 12/2011 | Barry et al. |
| 8,099,440 | B2 | 1/2012 | Johnson et al. |
| 8,203,972 | B2 | 6/2012 | Sauermann |
| 8,296,517 | B2 | 10/2012 | Potapov et al. |
| 8,392,382 | B2 | 3/2013 | Marwah et al. |
| 8,583,692 | B2 | 11/2013 | Ganesh et al. |
| 8,645,337 | B2 | 2/2014 | Kapoor et al. |
| 2001/0038642 | A1 | 11/2001 | Alvarez et al. |
| 2003/0108248 | A1 | 6/2003 | Huang et al. |
| 2003/0212694 | A1 * | 11/2003 | Potapov ............ G06F 16/24557 |
| 2004/0006574 | A1 * | 1/2004 | Witkowski .......... G06F 16/2264 |
| 2004/0033803 | A1 | 2/2004 | Varonen et al. |
| 2004/0117396 | A1 | 6/2004 | Avadhanam et al. |
| 2004/0139099 | A1 * | 7/2004 | Weaver ................... H03M 7/46 |
| 2005/0027729 | A1 | 2/2005 | Kuchinsky et al. |
| 2005/0086267 | A1 | 4/2005 | Avadhanam et al. |
| 2005/0210054 | A1 | 9/2005 | Harris |
| 2005/0216421 | A1 | 9/2005 | Barry |
| 2005/0278324 | A1 | 12/2005 | Fan et al. |
| 2006/0100912 | A1 | 5/2006 | Kumar et al. |
| 2007/0109155 | A1 | 5/2007 | Fallon |
| 2007/0143248 | A1 | 6/2007 | Uppala |
| 2007/0203958 | A1 | 8/2007 | Suzuki et al. |
| 2008/0010240 | A1 | 1/2008 | Zait |
| 2008/0050025 | A1 | 2/2008 | Bashyam et al. |
| 2008/0071818 | A1 | 3/2008 | Apanowicz et al. |
| 2008/0098048 | A1 | 4/2008 | Cao et al. |
| 2008/0162523 | A1 | 7/2008 | Kraus et al. |
| 2008/0294676 | A1 | 11/2008 | Faerber et al. |
| 2008/0294863 | A1 | 11/2008 | Faerber et al. |
| 2009/0006399 | A1 | 1/2009 | Raman et al. |
| 2009/0204626 | A1 | 8/2009 | Mustafa |
| 2009/0234823 | A1 | 9/2009 | Wong |
| 2009/0319536 | A1 | 12/2009 | Parker et al. |
| 2010/0030796 | A1 | 2/2010 | Netz et al. |
| 2010/0042587 | A1 | 2/2010 | Johnson et al. |
| 2010/0161567 | A1 | 6/2010 | Makela |
| 2010/0278446 | A1 | 11/2010 | Ganesh et al. |
| 2010/0281004 | A1 * | 11/2010 | Kapoor ............. G06F 16/24561 707/693 |
| 2010/0281079 | A1 | 11/2010 | Marwah et al. |
| 2011/0047330 | A1 | 2/2011 | Potapov et al. |
| 2011/0225322 | A1 * | 9/2011 | Demidov ............... H04N 19/70 709/247 |
| 2011/0295817 | A1 | 12/2011 | Chandrasekar et al. |
| 2012/0117038 | A1 | 5/2012 | Ganesh et al. |
| 2012/0143833 | A1 | 6/2012 | Ganesh et al. |
| 2013/0036101 | A1 | 2/2013 | Marwah |
| 2014/0074805 | A1 * | 3/2014 | Kapoor ................. G06F 16/902 707/693 |
| 2014/0279960 | A1 * | 9/2014 | Marwah ................ G06F 16/221 707/703 |
| 2014/0281247 | A1 * | 9/2014 | Loaiza .............. G06F 16/24552 711/126 |
| 2020/0364269 | A1 * | 11/2020 | Kwan ...................... G06F 18/23 |
| 2023/0004533 | A1 * | 1/2023 | Valiullin ............. H03M 7/3077 |

OTHER PUBLICATIONS

Sybase IQ, "An Advanced Columnar Data Warehouse Architecture", Winter Corporation, 17 pages, Dated Jun. 2010.

Sybase IQ, "Administration Guide", Document ID: 35375-01-1121-02, dated Sep. 19, 1997, 426 pages.

Stonebraker, M. et al., "C-Store: A Column-oriented DBMS", Proceedings of the 31st VLDB Conference, Trondheim, Norway 2005 (12 pages).

Rabb, David, "How to Judge a Columnar Database", Information Management, http://license.icopyright.net/user/viewFreeUse.act?fuid=MTMxMDAzMjU%3D, Dec. 14, 2007, 2 pages.

Macnicol Roger et al., "Sybase IQ Multiplex-Designed For Analytics", Proceedings of the 30th VLDB Conference, dated 2004, 4 pages.

Loshin, D., "Gaining the Performance Edge Using a Column-Oriented Database Management System" (2009) 12 pages.

Dittrich et al., "Towards a One Size Fits All Database Architecture" Proceedings of the 5th Biennial Conference on Innovative Data Systems Research, dated Jan. 6, 2011, 4 pages.

Abadi, Daniel J. et al., Column-Stores vs. Row-Stores: How Different Are They Really?, ACM 2008, SIGMOD, Jun. 9 Jun. 12, 2008, 14 pages.

Abadi, D. et al., "Integrating Compression and Execution in Column-Oriented Database Systems" Sigmod 2006 (12 pages).

"C-Store: A Column-Oriented DBMS" downloaded from the Internet Apr. 1, 2010 < http://db.csail.mit.edu/projects/cstore/#papers > 4 pages.

* cited by examiner

500

UNIFIED OLTP/OLAP FORMAT ACROSS MEMORY TIERS

BENEFIT CLAIM

This application claims benefit under 35 U.S.C. § 119(e) of provisional application 63/691,247, filed Sep. 5, 2024, by Neelam Goyal et al., the entire contents of which is hereby incorporated by reference.

TECHNICAL FIELD

The present disclosure is database storage and, more specifically, to an on-disk columnar format for representing relational data.

BACKGROUND

Computers are used to store and manage many types of data. Tabular data is one common form of data that computers are used to manage. Tabular data refers to any data that is logically organized into rows and columns. For example, word processing documents often include tables. The data that resides in such tables is tabular data. All data contained in any spreadsheet or spreadsheet-like structure is also tabular data. Further, all data stored in relational tables, or similar database structures, is tabular data.

Logically, tabular data resides in a table-like structure, such as a spreadsheet or relational table. However, the actual physical storage of the tabular data may take a variety of forms. For example, the tabular data from a spreadsheet may be stored within a spreadsheet file, which in turn is stored in a set of disk blocks managed by an operating system. As another example, tabular data that belongs to a relational database table may be stored in a set of disk blocks managed by a database server.

How tabular data is physically stored can have a significant effect on (1) how much storage space the tabular data consumes, and (2) how efficiently the tabular data can be accessed and manipulated. If physically stored in an inefficient manner, the tabular data may consume more storage space than desired, and result in slow retrieval, storage and/or update times.

Often, the physical storage of tabular data involves a trade-off between size and speed. For example, a spreadsheet file may be stored compressed or uncompressed. If compressed, the spreadsheet file will be smaller, but the entire file will typically have to be decompressed when retrieved, and re-compressed when stored again. Such decompression and compression operations take time, resulting in slower performance.

Compression Unit (CU)

A highly flexible and extensible data structure for physically storing tabular data is referred to as a "compression unit," which may be used to physically store columnar data that logically resides as tabular data. For example, CUs may be used to store tabular data from spreadsheets, relational database tables, or tables embedded in word processing documents. There are no limits with respect to the nature of the logical structures to which the tabular data that is stored in compression units belongs.

Each CU may store data for all columns of the corresponding table. For example, if a table has twenty columns, then each CU for that table will store data for different rows, but each of those rows will have data for all twenty columns.

CUs include metadata that indicates how the tabular data is stored within them. The metadata for a CU may indicate, for example, whether the data within the CU unit is stored in column major-format (or some combination thereof), the order of the columns within the CU (which may differ from the logical order of the columns dictated by the definition of their logical container), a compression technique for the CU, the child compression units (if any), etc.

There are a number of drawbacks of current CUs. For example, current CUs limit the number of rows that can be stored in the CU, which hinders the utility of CUs. If a CU could include many more rows, then the time to process CUs in memory could be reduced.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HCC

Hybrid Columnar Compression (HCC) is an on-disk, columnar format for storing tabular data. HCC relies on a block format as the fundamental building unit in order to leverage native transactional support, recovery, and locking.

Figure 1:
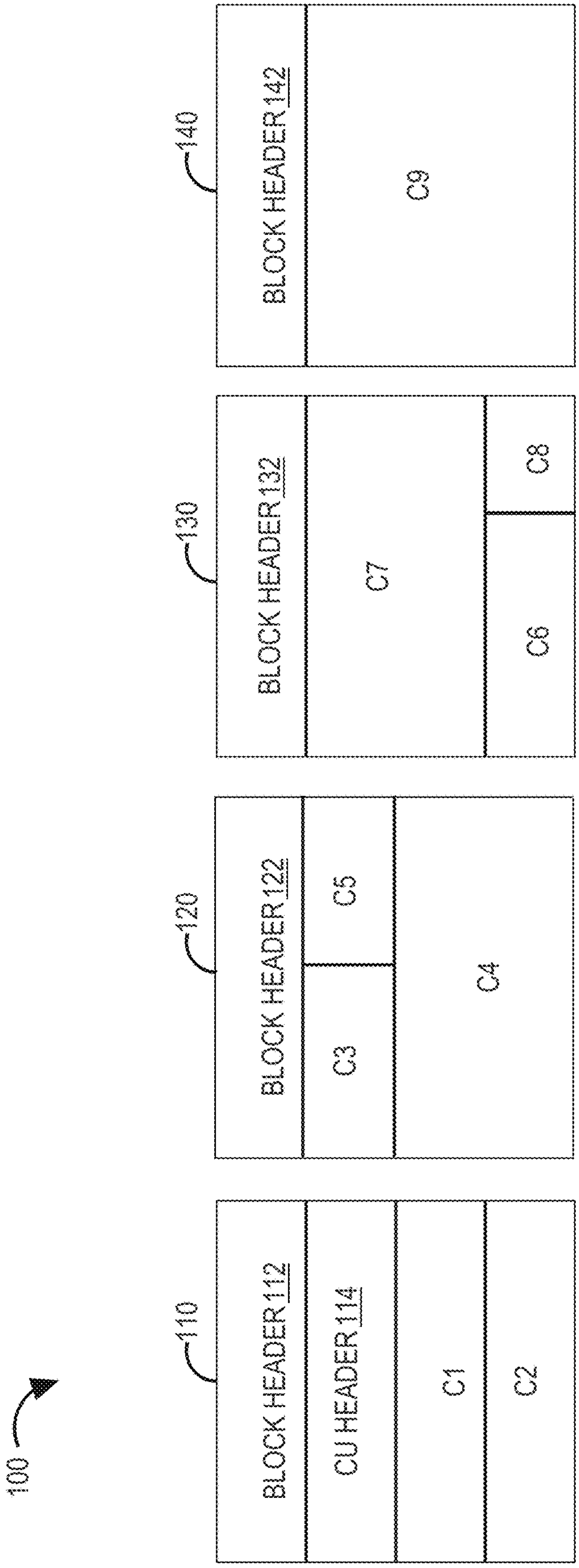
FIG. 1 is a block diagram that depicts an example compression unit, in an embodiment.

FIG. 1 is a block diagram that depicts an example compression unit 100, in an embodiment. CU 100 comprises four data blocks 110-140. Each data block includes a block header (i.e., block headers 112-142). Data block 110 is considered a header data block because it includes a CU header that contains metadata about the rows that CU 100 represents. Data block 110 contains data from columns C1 and C2 (of a table, whose metadata is not shown); data block 120 contains data from columns C3, C4, and C5; data block 130 contains data from columns C6, C7, and C8; and data block 140 contains data from column C9. Thus, CU 100 is in columnar format, not a row major format. In other embodiments, data from a single column may be spread across two or more data blocks. This is possible if the data item in each row of the column contains a significant amount of data, such a long string or sequence of characters.

HCC is beneficial for OLAP (online analytical processing) workloads and for workloads that are a mix of OLAP and OLTP (online transaction processing), which comprises inserts, deletes, and updates. If a workload is primarily OLTP in nature, then a database administrator may select a different storage format for data (stored in a database managed by the database administrator) that is subject to that type of processing.

An HCC CU may be compressed at one of multiple different levels of compression. Example levels of compression include query-level compression and archive-level compression. Query-level compression is concerned with speed, such that compression techniques that require less time to decompress compressed data in order to perform a query operation (e.g., a read or a write) are used, even though the space savings might not be as significant as other compression techniques. Archive-level compression is concerned with space savings, such that compression techniques that result in the most space savings are used even though it may take a significant amount of time to decompress the compressed data. Thus, "decompressing" data within a CU refers to reverting the compressed data into an uncompressed state, making the data readable by query operations and analytical operations.

Because the block-based infrastructure imposes some fundamental limitations, HCC is limited to relatively small CUs. For example, an HCC CU size ranges from 32K-256K based on the chosen compression level. However, an HCC CU can only support up to 32K rows (or 4K rows with row-level locking). These limits exist because of the following block-based concepts.

First, a row identifier ("ROWID") identifies a physical row using a data block address (DBA) (that identifies a data block) and a slot number within the data block. The slot number is represented by 15 bits, which limits the maximum number of rows to 32K. A CU may span multiple blocks, but a single CU header represents all rows in the CU. Therefore, the number of rows within a CU is also capped by the 32K limit.

With a relatively small number of rows in an HCC CU, the level of compression tends to not be as good. For example, dictionary encoding applied ten times, one for each CU, is less efficient than applying dictionary encoding once on a single, larger CU. First, in the former case, multiple dictionaries need to be created, requiring more processing time and storage space to store all those dictionaries instead of creating a single dictionary for a single CU. Second, decompressing the content of multiple CUs requires more processing time than decompressing the content of a single CU, even though the multiple CUs and the single CU respectively represent the same amount of data.

Second, row-level locking may be enabled for HCC to achieve higher DML concurrency. Row level locking may be enabled by default. The number of rows locked by a single transaction is represented by 12 bits, which further limits the number of rows within a CU to 4K. This 32K/4K row limit per 1 MB (or larger) CU is relatively small. There is a need to redesign the CU disk format to remove these limits.

Another drawback to HCC is that, depending on implementation, there is a mismatch between HCC (i.e., on-disk format) and other memory tiers, such as Cell Memory in Exadata Flash Cache and in-memory CUs in a database in-memory (DBIM) area. The techniques used to encode data in HCC are different from techniques that are used to encode data in other memory tiers. This results in different performance characteristics across memory tiers and hinders seamlessly paging data in and out across different memory tiers.

General Overview

A system and method for storing and processing compression units (CUs) are provided. A CU is a representation of a set of rows from a database table. In one technique, a CU comprises multiple data blocks: a primary header data block and one or more secondary header data blocks. The secondary header data blocks allow for an arbitrary number of rows to be represented by the CU instead of having to limit the number of rows based on characteristics of the row addressing scheme.

Embodiments, therefore, improve computer technology by allowing for large CUs that help speed up analysis operations that take CUs as input. Processing fewer CUs requires fewer computing resources than processing more CUs representing the same amount of data as the fewer CUs.

Flexible Physical Row Addressing

Figure 2:
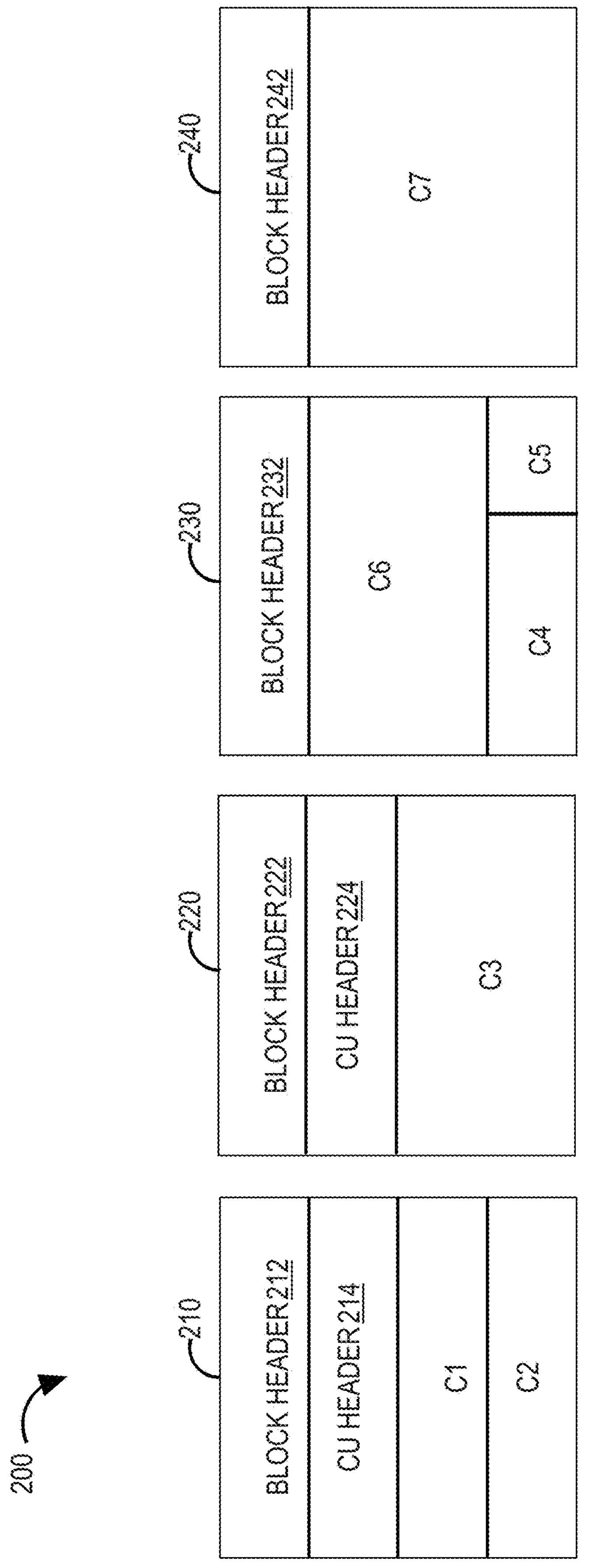
FIG. 2 is a block diagram that depicts an example of an "unlimited" compression unit that implements flexible physical row addressing, in an embodiment.

FIG. 2 is a block diagram that depicts an example of an "unlimited" compression unit 200 that implements flexible physical row addressing, in an embodiment. CU 200 is "unlimited" in the sense that CU 200 may represent a virtually unlimited number of rows. A CU according to embodiments may be referred to as an "MHCC (Memory Speed Hybrid Columnar Compression) CU." In this example, CU 200 comprises four CU blocks 210-240. A CU may comprise more or less blocks. Also, in this example, there is a single secondary header block (i.e., block 220), which is described in more detail herein. However, a CU may comprise more than one secondary header block. Furthermore, each CU block contains a block header (e.g., block headers 212-242). The block header contains buffer cache and transaction management metadata.

The size of CU 200 is only limited by definitional constraints on the size of each CU. An example of a definitional size of a CU is 1 MB; however, other implementations may have larger or smaller sizes, such as 4 MB or 10 MB. Given a definitional size of 1 MB, depending on the number of columns and the size of each column, the number of rows that a CU represents may vary greatly from a few hundred rows to over 100K rows. However, as described herein, a current maximum number of rows that an HCC CU may represent is 32K, if row locking is not enabled.

In order to increase the current maximum number of rows, a flexible physical row addressing mechanism is implemented, which involves using multiple CU headers to represent more rows in an arbitrarily large CU. Each MHCC CU comprises multiple blocks (e.g., blocks 210-240), only one of which includes a primary header and, in at least one instance of a CU, one or more blocks that each include a secondary header. The block that includes the primary header of the CU is referred to herein as the "primary header block." CU block 210 is an example of a primary header block. A block that includes a secondary header is referred to herein as a "secondary header block."

The primary header (e.g., CU header 214) in a primary header block includes a mapping that indicates which underlying data blocks (from storage) are part of the corresponding CU. Thus, a CU block is different than the data blocks from which the CU originates. A CU header block contains metadata about CU organization and a CU data block mainly contain payload. Each row in each underlying data block is referenced by a combination of a DBA and a slot number. After all the metadata in a primary header block is stored, the primary header block may have space left over to store a portion of the payload (i.e., one or more columns) that is part of the CU. Columns C1 and C2 in the example of FIG. 2 are stored in this portion of the payload. Other blocks of the CU (e.g., blocks 230 and 240) may have more space to store a larger portion of the payload.

The primary header (e.g., CU header 214) in a primary header block (e.g., block 210) and a secondary header in a secondary header block may also contain a lock vector that indicates which rows are locked. The primary header and a secondary header may also contain a delete vector that indicates which rows have been deleted due to DML (data manipulation language) activity. A delete vector contains bits representing rows that are tracked by a header and a marked bit indicates a deleted row at that position in the block corresponding to that header. The delete vector is consulted when constructing or assembling table data in volatile memory from the CU (and, optionally, other CUs) in order to identify and exclude a row that has been deleted. Again, each row is identified by a ROWID that comprises a unique DBA-slot number pair. For example, a delete vector is a bit vector where the Nth bit corresponds to the Nth row that is represented by the corresponding primary (or secondary) header. The delete vector may be stored uncompressed so that the CU does not require to be decompressed in order to read and/or update the delete vector.

The primary header may also contain a "contained unit header" that comprises a mapping of column to offset within the CU. Thus, the mapping indicates the beginning of each column that the CU represents. The offset may comprise a combination of a CU block identifier and a byte offset into that CU block. The CU block identifier uniquely identifies the CU block in which the first byte of the corresponding column appears.

The header (e.g., CU header 224) of a secondary header block (e.g., block 220) (which header is a "secondary header") also represents a certain number of rows, such as up to 32K rows, depending on the implementation of the physical row addressing scheme.

A primary header block and a secondary header block are both considered types of "header blocks." A block of a CU that is not a header block is considered a "non-header block." Each non-primary header block of a CU may include a reference that points to the primary header block of the CU.

In an embodiment, a header in a CU block includes a first flag that indicates whether the CU block is part of a MHCC CU and/or a second flag that indicates whether the CU block contains a secondary header. Other data in the header may indicate whether the CU block is a primary header block.

By using multiple headers (i.e., a primary header and one or more secondary headers), the number of rows in a CU is only limited by the definitional size of a CU rather than per-data block limits. The bulk of the CU metadata is contained in the primary header block. However, secondary header blocks track different row ranges. Secondary header blocks may also contain a lock vector and a delete vector, similar to a primary header block.

Each CU may be compressed differently. For example, one CU from one table may be compressed using one compression technique and another CU from the same table may be compressed using a different compression technique. Also, columns within the same CU may be compressed differently. For example, one column within a CU may be compressed using one compression technique while another column within the CU may be compressed using a different compression technique.

Example Process

Figure 3:
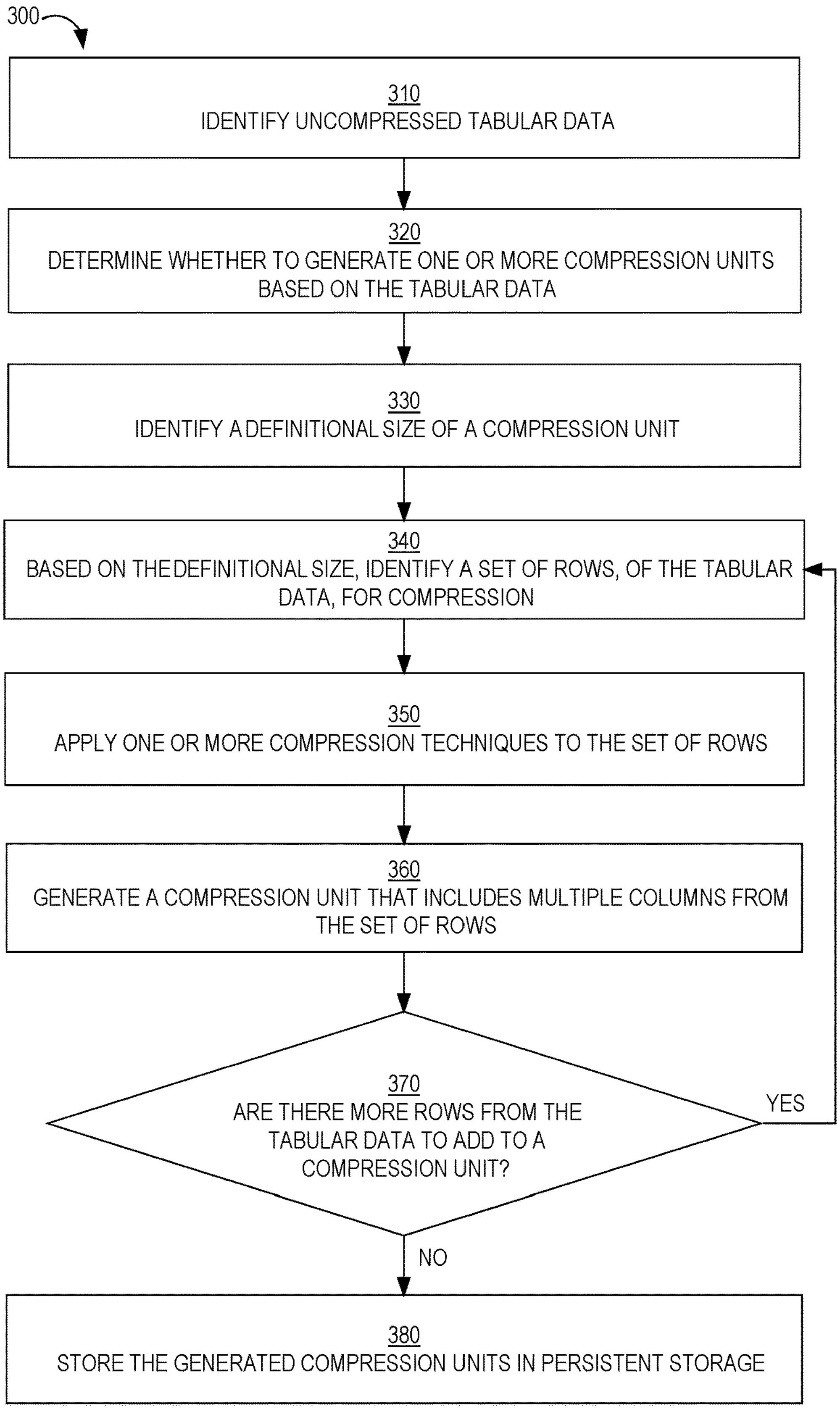
FIG. 3 is a flow diagram that depicts an example process for generating a compression unit, in an embodiment.

FIG. 3 is a flow diagram that depicts an example process 300 for generating a compression unit, in an embodiment.

At step 310, uncompressed tabular data is identified. The tabular data (e.g., a table) may be stored in persistent storage. The tabular data may be stored in multiple data blocks. The tabular data may be identified automatically by a background process that automatically considers uncompressed data for possible compression. Additionally or alternatively, such data may be identified based on user input that identifies the tabular data (e.g., a table identifier) or data associated with the tabular data, such as a tablespace identifier (that identifies a tablespace that includes one or more sets of tabular data) or a database identifier (that identifies a database that includes one or more sets of tabular data).

At step 320, it is determined whether to generate one or more compression units based on the tabular data. Step 320 may involve determining whether the tabular data may benefit from one or more compression techniques. Alternatively, if a user requests a columnar compression on a table, then columnar compression is applied to the table. However, some compression techniques may be avoided (e.g., byte-level compression, such as zstd) if such compression techniques would result in negative compression.

At step 330, a definitional size of a CU is identified. This definitional size may be a default size (e.g., established by a database administrator) or may be specified by a database user, such as an owner of the tabular data, which owner may be from a different party than the database administrator. The final CU might not exactly reach the definitional size due to factors such as compression ratio, data skew, etc.

At step 340, based on the definitional size, a set of (potentially consecutive) rows of the tabular data are identified for compression. The number of rows in the set of rows is selected based on an amount of compression that is predicted to result from applying one or more compression techniques to the rows. This amount of compression may be a percentage reduction in space usage of the set of rows.

At step 350, one or more compression techniques are applied to the set of rows. Step 350 may involve applying a single compression technique on one or more columns of the set of rows, but each column is encoded and compressed separately. Alternatively, step 350 may involve applying different compression techniques to different columns of the set of rows.

At step 360, a compression unit is generated that includes all the columns from the set of rows. Step 360 comprises generating a primary header block that identifies a first set of rows from the tabular data and generating one or more secondary header blocks, each of which identifies a different set of rows from the tabular data. Step 360 may also comprise generating one or more non-header blocks that store column data from the sets of rows represented by the header blocks.

At step 370, it is determined whether there are any more rows of the tabular data to process for adding to a compression unit. If so, process 300 returns to step 340, where another set of rows from the tabular data is identified. Otherwise, process 300 proceeds to step 370.

At step 380, the compression units that have been generated for the tabular data are stored in persistent storage. Step 380 may be performed for one or more compression units before all the rows from the tabular data are processed for compression. Once all the rows in the tabular data are processed for compression and compression units have been generated therefor, the tabular data may be deleted.

Increase Row Level Locking

As described herein, current techniques limit the number of rows in a CU if row level locking is enabled. In an embodiment, to lift this limit, bits are borrowed to increase the number of rows that a CU may comprise. For example, the bits are borrowed from an ITL (Interested Transaction List) entry, which is part of a transaction block header within a CU data block. In one implementation, the number of bits is three, which means that if the limit on the number of rows of a CU is 4K using current techniques, then a CU may include up to 32K locks. Overloading the same three bits to store the lock count value is satisfactory as these values can be distinguished based on transaction state. When a transaction is in an active state, these three bits are used to store a lock count. When the transaction is in a commit state, these same three bits may be used to store a timestamp, or system change number (SCN).

Format Unity

A discrepancy between HCC and Cell Memory/Database In-Memory is the set of algorithms that are used to encode the data. In an embodiment, to bridge this mismatch, MHCC adopts the same data encoding algorithms that are used by Cell Memory and Database In-Memory features. This unifies the format suitable for mixed workloads across memory tiers. This also enables the paging of CUs in and out of different memory tiers with minimal transformation. Cell Memory population and Database In-Memory population can be very CPU intensive and expensive. Also, any DML (data manipulation language) activity can cause invalidation of cache CUs, causing a performance penalty. MHCC allows for much faster population because unified formats make it easier to cache hot data quickly.

Scanning

While the distributed header design of an MHCC CU "unlimits" the target size of the CU, this design has non-trivial implications on access methods, such as fetch-by-rowid, scans, and updates along with the loading process itself.

An MHCC CU may be the subject of multiple types of scans: a full table scan, a range scan, and a disk verification scan. A full table scan decompresses the entire MHCC CU. The MHCC CU is decompressed once when the primary header is encountered. "Decompression" in this context refers to assembling a CU in memory in preparation for data processing. A full table scan processes the rows tracked by the primary header data block until the scan pins the next block and skips decompression on secondary header data blocks. This is the fastest type of scan because CU rows can be processed in one shot.

A range scan decompresses an entire CU once on a header, which header might not be the primary header. A range scan processes the rows tracked by this one header block until the scan pins the next block and skips decompression on other headers of the CU. To be more specific, for each CU, decompression happens on the CU header that is within the rowid range of the range scan and is closest to the low rowid. If the low rowid is not specified, then the header that resides in the smallest data block address (DBA) is selected. A range scan is also a fast type of scan because this type of scan is able to obtain all valid rows in the range during a single scan of the CU. There is some additional cost to skip the out-of-range slots.

The following is an example of three CUs that are involved in a range scan where the ROWID range is 101.10-109.30. 101.10 is the low ROWID, whereas 109.30 is the high ROWID. The first number in each ROWID (i.e., 101 and 109) are DBAs, while the second number in each ROWID (i.e., 10 and 30) are slot numbers. In this example, a segment from a table has 11 blocks: 100-110.

a. CU A has three headers (two of which are secondary headers): 100 102 103
b. CU B has three headers (two of which are secondary headers): 101 105 106
c. CU C has four headers (three of which are secondary headers): 107 108 109 110

One way to view this 11-block segment is as follows:

100 (A) 101 (B) 102 (A) 103 (A) 104 (A) 105 (B) 106 (B) 107 (C) 108 (C) 109 (C) 110 (C)

A range scan will pin blocks from 100-110.

a. First, block 100 is skipped because it is not within the range of the range scan.
b. Second, block 101 is pinned and it is determined that block 101 is within the range of the range scan and is the closest header of CU B to the low ROWID's DBA of 101. Therefore, CU B is decompressed (i.e., assembled in memory) and all the rows of CU B within the range are processed.
c. Third, block 102 is pinned and it is determined that block 102 is within the range of the range scan and is the closest header of CU A to the low ROWID's DBA of 101. Therefore, CU A is decompressed (i.e., assembled in memory) and all the rows of CU A within the range are processed.
d. Fourth, block 103 is pinned and it is determined that block 103 is within the range of the range scan, but that block 103 is not the closest header of CU A to the low ROWID's DBA of 101. Therefore, block 103 is skipped.
e. Fifth, block 104 is pinned and it is determined that block 104 is within the range of the range scan, but that block 104 is not the closest header of CU A to the low ROWID's DBA of 101. Therefore, block 104 is skipped.
f. Sixth, block 105 is pinned and it is determined that block 105 is within the range of the range scan, but that block 105 is not the closest header of CU B to the low ROWID's DBA of 101. Therefore, block 105 is skipped.
g. Seventh, block 106 is pinned and it is determined that block 106 is within the range of the range scan, but that block 106 is not the closest header of CU B to the low ROWID's DBA of 101. Therefore, block 106 is skipped.
h. Eighth, block 107 is pinned and it is determined that block 107 is within the range of the range scan and is the closest header of CU C to the low ROWID's DBA of 101. Therefore, CU C is decompressed (i.e., assembled in memory) and all the rows of CU C within the range are processed.
i. Ninth, block 108 is pinned and it is determined that block 108 is within the range of the range scan, but that block 108 is not the closest header of CU C to the low ROWID's DBA of 101. Therefore, block 108 is skipped.
j. Tenth, block 109 is pinned and it is determined that block 109 is within the range of the range scan, but that block 109 is not the closest header of CU C to the low ROWID's DBA of 101. Therefore, block 109 is skipped.
k. Eleventh, block 110 is skipped because block 110 is not within the range of the range scan.

In this example, none of the blocks in this 11-block segment is a non-header block. If a range scan reaches a non-header block during a scan, then the range scan skips the non-header block.

A disk verification scan is a multi-pass scan, meaning that this scan decompresses on every header and processes the rows tracked by each header until it pins the next block. This type of scan is slow because the scan processes rows from a CU in a block-by-block fashion. The rationale of this behavior is that this type of scan requires the following principle to be honored: once the scan pins a block, the scan only processes and returns the rows tracked by this block until the scan pins the next block. If the scan returns rows tracked by other headers of the CU, then the caller will treat it as an incorrect result. This type of scan may be optimized by re-using the decompression context if the previous header and current header belong to the same CU.

Auto-Reorganization

The data portion of a CU is immutable. DMLs create holes in existing CUs because data is not updated in-place. Instead, a delete is marked by, for example, setting a bit in a delete vector in the CU header. Thus, old, deleted rows continue occupying space in the CU. New data is inserted into a row-based format with no affinity to existing CU data. Such a CU is referred to as a "dirty CU." The more deletes and inserts a CU has, the "dirtier" the CU is considered.

Accordingly, queries can experience significant degradation in performance if most of the rows in a CU were invalidated. This is because queries need to scan additional blocks with new inserts in suboptimal format. The problem is acute for relatively dirty CUs because the cost of reading a dirty CU is paid even though decompressing the entire dirty CU results in reading just a few remaining rows.

In an embodiment, a CU is automatically analyzed to determine whether the CU is a candidate for reorganization. This determination may be based on one or more criteria, such as the CU's "dirtiness" and its "coldness." The "coldness" (or "hotness" as its opposite) of a CU refers to the extent that transactions are accessing the CU. If no active transaction is accessing the CU, then the CU is considered "cold." If multiple active transactions are accessing the CU, then the CU is considered very "hot." If a CU is both (relatively) dirty and cold, then the CU is a candidate for reorganization. The criteria for dirty may be a threshold number of deletes, a threshold number of inserts, or a combination of a certain number of deletes and a certain number of inserts.

The automatic check for dirtiness and coldness may be performed in a background process. Additionally or alternatively, this automatic check may be performed as part of an existing automatic check to determine whether all rows in a CU have been deleted.

In an embodiment, reorganization of a CU involves identifying any remaining rows in the CU and moving those remaining rows, either in row-major format in a regular data block or in columnar format to another CU. In this latter scenario, the remaining rows are recompressed in the other CU. Additionally or alternatively, reorganization of a CU involves combining the remaining rows of two or more dirty CUs which do not need to be from adjacent data blocks into one or two new CUs. Reorganization may involve compressing (or recompressing) the remaining rows using one or more compression techniques, deleting the remaining rows from the old CUs, and performing index maintenance, such as updating any indexes that referred to the old ROWIDs of those remaining rows and replacing those old ROWIDs with new ROWIDs corresponding to the "new" CUs to where the remaining rows were moved as part of the reorganization.

Advantages

Existing solutions for caching data across memory tiers are geared towards either OLTP workloads or OLAP workloads. In other words, the data resides either in row-based format suitable for OLTP or column-based format suitable for OLAP. Existing solutions need to either transform or maintain two copies of the data in two different formats suitable for OLTP and OLAP support mixed workloads. MHCC data is suitable for mixed workloads and can be cached seamlessly across memory tiers based on need. Because the on-disk format is built on top of RDBMS's block-based architecture, MHCC data may leverage transactional support.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
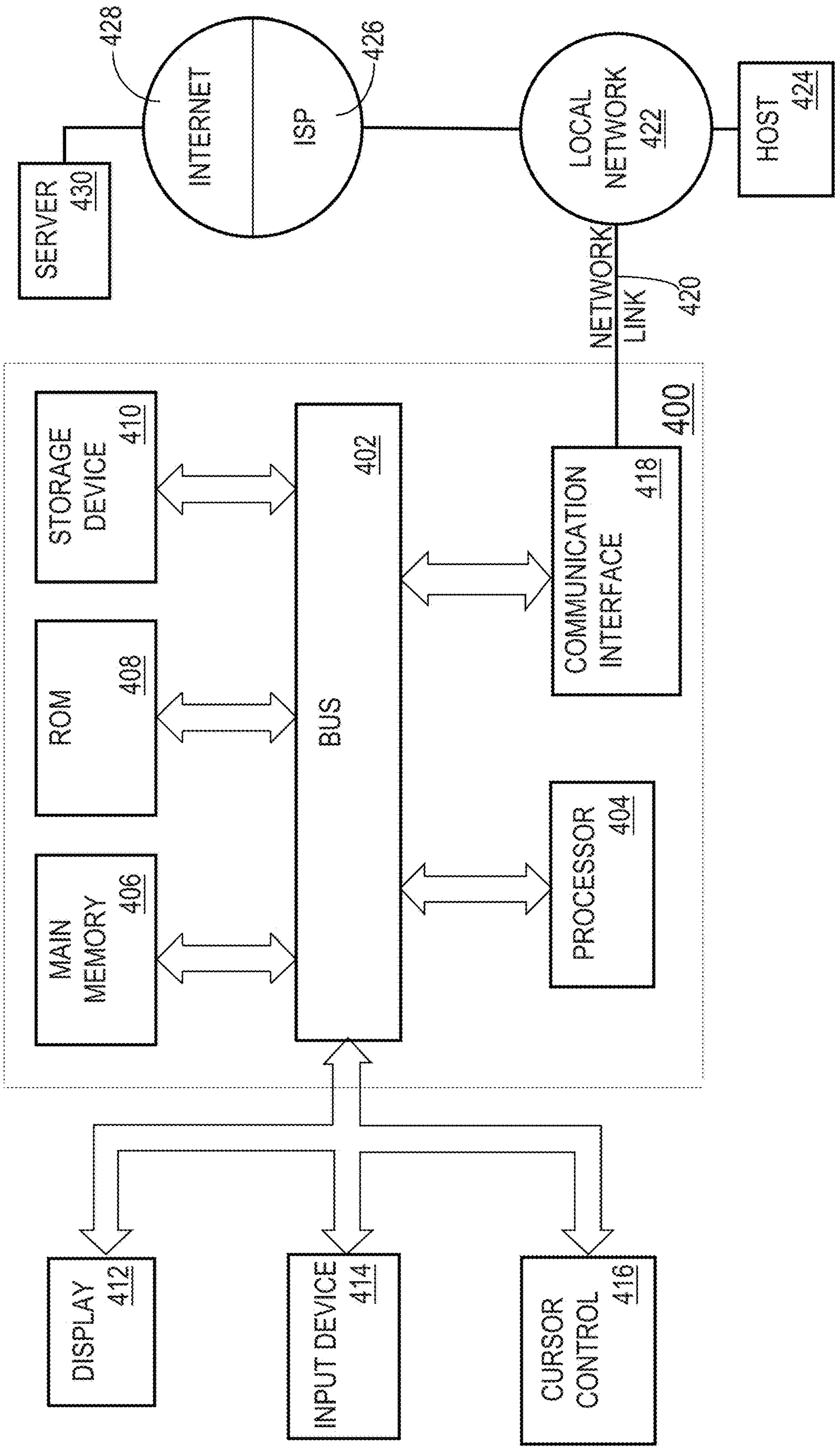
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
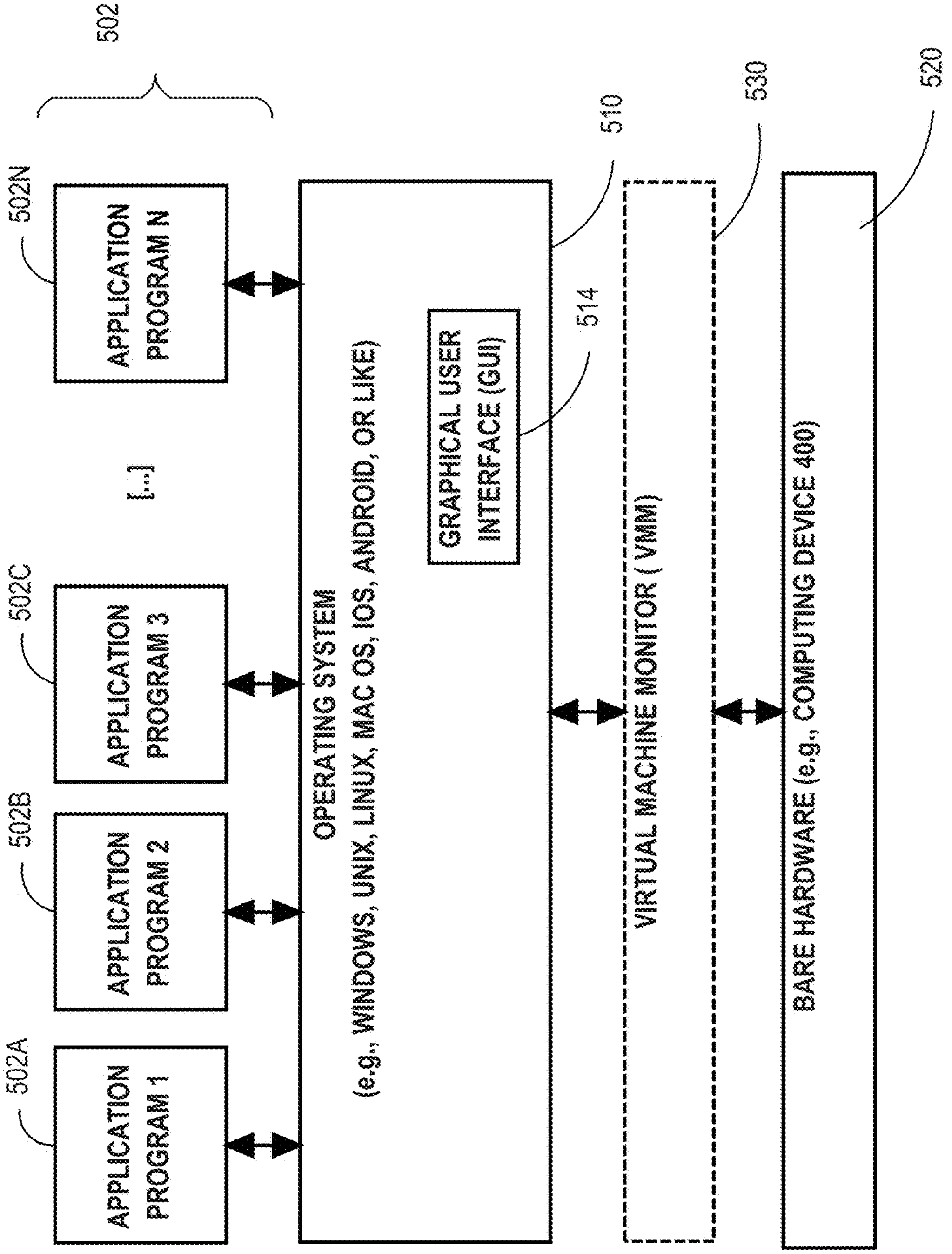
FIG. 5 is a block diagram of a basic software system that may be employed for controlling the operation of the computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating a compression unit that comprises a plurality of data blocks, wherein the compression unit stores tabular data from a database table in a columnar format;

wherein the plurality of data blocks includes (1) a primary header block that represents a first set of rows of the tabular data and (2) a secondary header block that represents a second set of rows, of the tabular data, that is different than the first set of rows, wherein the secondary header block and any other second header blocks in the plurality of data blocks allow for an arbitrary number of rows to be represented by the compression unit;

storing the compression unit in persistent storage;

wherein the method is performed by one or more computing devices.

2. The method of claim 1, wherein:

the secondary header block is a first secondary header block;

the plurality of data blocks includes a second secondary header block that represents a third set of rows, of the tabular data, that is different than the first set of rows and the second set of rows.

3. The method of claim 1, wherein the secondary header block contains a delete vector that indicates one or more rows, in the second set of rows, that have been deleted.

4. The method of claim 1, wherein the secondary header block contains a lock vector that indicates one or more rows, in the second set of rows, that are locked by one or more transactions.

5. The method of claim 1, further comprising:

including, in the primary header block, a lock vector that borrows one or more bits from an entry that is used to store a timestamp of a transaction, wherein a length of the lock vector indicates a maximum number of rows that can be locked by the compression unit.

6. The method of claim 1, further comprising:

determining one or more characteristics of the compression unit;

based on the one or more characteristics, determining whether to reorganize the compression unit.

7. The method of claim 6, wherein the one or more characteristics include one or more of a number of active transactions that are accessing the compression unit, a number of rows that are deleted from the compression unit, or a number of rows, in row-major format, that have been inserted into the compression unit.

8. The method of claim 6, further comprising:

in response to determining to reorganizing the compression unit:

inserting, into a data block, in row-major format, one or more rows from the compression unit; or creating a new compression unit based on the one or more rows from the compression unit and one or more rows from another compression unit.

9. The method of claim 1, further comprising:

in response to receiving a scan instruction:

identifying the primary header block;

assembling contents of the compression unit in memory based on analyzing the primary header block and accessing other data blocks of the plurality of data blocks based on the primary header block.

10. The method of claim 1, further comprising:

in response to receiving a range scan instruction:

identifying a low row identifier in a row identifier range that is indicated in the range scan instruction;

for each data block of two or more header blocks in the plurality of data blocks;

determining whether said each data block is within the row identifier range;

determining whether said each data block is the closest header data block of the compression unit to the low row identifier;

if it is determined that said each data block is within the row identifier row and said each data block is the closest header data block of the compression unit to the low row identifier, then assembling contents of the compression unit in memory based on analyzing said each data block and accessing other data blocks of the plurality of data blocks based on said each data block.

11. One or more non-transitory storage media storing instructions which, when executed by one or more computing devices, cause:

generating a compression unit that comprises a plurality of data blocks, wherein the compression unit stores tabular data from a database table in a columnar format;

wherein the plurality of data blocks includes (1) a primary header block that represents a first set of rows of the tabular data and (2) a secondary header block that represents a second set of rows, of the tabular data, that is different than the first set of rows, wherein the secondary header block and any other second header blocks in the plurality of data blocks allow for an arbitrary number of rows to be represented by the compression unit;

storing the compression unit in persistent storage.

12. The one or more storage media of claim 11, wherein:

the secondary header block is a first secondary header block;

the plurality of data blocks includes a second secondary header block that represents a third set of rows, of the tabular data, that is different than the first set of rows and the second set of rows.

13. The one or more storage media of claim 11, wherein the secondary header block contains a delete vector that indicates one or more rows, in the second set of rows, that have been deleted.

14. The one or more storage media of claim 11, wherein the secondary header block contains a lock vector that indicates one or more rows, in the second set of rows, that are locked by one or more transactions.

15. The one or more storage media of claim 11, wherein the instructions, when executed by the one or more computing devices, further cause:

including, in the primary header block, a lock vector that borrows one or more bits from an entry that is used to store a timestamp of a transaction, wherein a length of the lock vector indicates a maximum number of rows that can be locked by the compression unit.

16. The one or more storage media of claim 11, wherein the instructions, when executed by the one or more computing devices, further cause:

determining one or more characteristics of the compression unit;

based on the one or more characteristics, determining whether to reorganize the compression unit.

17. The one or more storage media of claim 16, wherein the one or more characteristics include one or more of a number of active transactions that are accessing the compression unit, a number of rows that are deleted from the compression unit, or a number of rows, in row-major format, that have been inserted into the compression unit.

18. The one or more storage media of claim 16, wherein the instructions, when executed by the one or more computing devices, further cause:

in response to determining to reorganizing the compression unit:

inserting, into a data block, in row-major format, one or more rows from the compression unit; or creating a new compression unit based on the one or more rows from the compression unit and one or more rows from another compression unit.

19. The one or more storage media of claim 11, wherein the instructions, when executed by the one or more computing devices, further cause:

in response to receiving a scan instruction:

identifying the primary header block;

assembling contents of the compression unit in memory based on analyzing the primary header block and accessing other data blocks of the plurality of data blocks based on the primary header block.

20. The one or more storage media of claim 11, wherein the instructions, when executed by the one or more computing devices, further cause:

in response to receiving a range scan instruction:

identifying a low row identifier in a row identifier range that is indicated in the range scan instruction;

for each data block of two or more header blocks in the plurality of data blocks;

determining whether said each data block is within the row identifier range;

determining whether said each data block is the closest header data block of the compression unit to the low row identifier;

if it is determined that said each data block is within the row identifier row and said each data block is the closest header data block of the compression unit to the low row identifier, then assembling contents of the compression unit in memory based on analyzing said each data block and accessing other data blocks of the plurality of data blocks based on said each data block.

* * * * *